US012730419B2

(12) United States Patent
Schmidt et al.

(10) Patent No.: US 12,730,419 B2
(45) Date of Patent: Sep. 8, 2026

(54) MACHINE LEARNING SYSTEM AND METHOD FOR CONNECTING LEARNING MODEL AND INDUSTRIAL PLANT THROUGH ABSTRACTION LAYER

(71) Applicant: ABB Schweiz AG, Baden (CH)

(72) Inventors: Benedikt Schmidt, Heidelberg (DE); Ido Amihai, Heppenheim (DE); Arzam Muzaffar Kotriwala, Ladenburg (DE); Moncef Chioua, Montreal (CA); Dennis Janka, Heidelberg (DE); Felix Lenders, Darmstadt (DE); Jan Christoph Schlake, Darmstadt (DE); Martin Hollender, Dossenheim (DE); Hadil Abukwaik, Weinheim (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 630 days.

(21) Appl. No.: 17/956,076

(22) Filed: Sep. 29, 2022

(65) Prior Publication Data

US 2023/0019201 A1 Jan. 19, 2023

Related U.S. Application Data

(63) Continuation of application No. PCT/EP2021/058474, filed on Mar. 31, 2021, which (Continued)

(51) Int. Cl.
*G05B 13/02* (2006.01)
*G05B 19/418* (2006.01)
*G06N 20/00* (2019.01)

(52) U.S. Cl.
CPC ... *G05B 13/0265* (2013.01); *G05B 19/41835* (2013.01); *G06N 20/00* (2019.01); *G05B 2219/32015* (2013.01)

(58) Field of Classification Search
CPC .......... G05B 13/0265; G05B 19/41835; G05B 2219/32015; G05B 17/02;
(Continued)

(56) References Cited

U.S. PATENT DOCUMENTS 7,827,122 B1 11/2010 Campbell, Jr. et al.
9,390,376 B2 * 7/2016 Harrison ................ G06N 5/043
(Continued)

FOREIGN PATENT DOCUMENTS

CA 2210207 A1 1/1999
CA 2788550 A1 2/2014
(Continued)

OTHER PUBLICATIONS

Arroyo et al., "Integrating Plant and Process Information as a Basis for Automated Plant Diagnosis Tasks," *Proceedings of the 2014 IEEE Emerging Technology and Factory Automation* (*ETFA*), IEEE, 8 pp. (Sep. 16-19, 2014).
(Continued)

*Primary Examiner* — Md Azad
(74) *Attorney, Agent, or Firm* — Fitch Even Tabin & Flannery LLP

(57) ABSTRACT

An industrial plant machine learning system includes a machine learning model, providing machine learning data, an industrial plant providing plant data and an abstraction layer, connecting the machine learning model and the industrial plant, wherein the abstraction layer is configured to provide standardized communication between the machine learning model and the industrial plant, using a machine learning markup language.

14 Claims, 1 Drawing Sheet

Related U.S. Application Data is a continuation of application No. PCT/EP2020/059169, filed on Mar. 31, 2020.

(58) Field of Classification Search
CPC .... G05B 19/41885; G05B 2219/32352; G06N 20/00; G06N 5/022; G06N 3/082; G06N 3/045; G06N 3/088; Y02P 90/80
USPC .............................................................. 700/47
See application file for complete search history.

(56) References Cited

U.S. PATENT DOCUMENTS

| | | | | |
|---|---|---|---|---|
| 9,895,853 | B2 * | 2/2018 | Yu | B29D 17/005 |
| 9,916,853 | B2 * | 3/2018 | Yu | G03H 1/30 |
| 10,788,031 | B2 * | 9/2020 | Singal | F04B 49/065 |
| 11,126,171 | B2 | 9/2021 | Cella et al. | |
| 11,303,518 | B2 * | 4/2022 | Böhm | H04L 41/0873 |
| 11,443,132 | B2 * | 9/2022 | Yellin | G06F 18/285 |
| 11,685,047 | B2 * | 6/2023 | Kolluri | G05B 19/423 700/246 |
| 2003/0172344 | A1 * | 9/2003 | Dencker | G06F 40/103 715/236 |
| 2010/0332373 | A1 * | 12/2010 | Crabtree | G06Q 40/04 709/224 |
| 2015/0094968 | A1 * | 4/2015 | Jia | G05B 15/02 702/60 |
| 2016/0098037 | A1 * | 4/2016 | Zornio | H04L 43/045 700/20 |
| 2017/0006135 | A1 * | 1/2017 | Siebel | G06F 16/25 |
| 2017/0102678 | A1 * | 4/2017 | Nixon | G05B 19/4185 |
| 2017/0132538 | A1 | 5/2017 | Ohara et al. | |
| 2017/0314961 | A1 | 11/2017 | Chen et al. | |
| 2017/0357908 | A1 * | 12/2017 | Cabadi | G05B 13/0265 |
| 2018/0115598 | A1 | 4/2018 | Shariat et al. | |
| 2018/0322385 | A1 * | 11/2018 | Yehezkel Rohekar | G06N 3/09 |
| 2019/0095792 | A1 * | 3/2019 | Kashinath | G06N 20/20 |
| 2019/0108417 | A1 * | 4/2019 | Talagala | G06F 18/217 |
| 2019/0354850 | A1 * | 11/2019 | Watson | G06N 3/045 |
| 2019/0354895 | A1 * | 11/2019 | Vasudevan | G06N 3/006 |
| 2020/0117999 | A1 * | 4/2020 | Yoon | G06N 3/084 |
| 2020/0192306 | A1 * | 6/2020 | Virani | G05B 13/0275 |
| 2020/0327371 | A1 * | 10/2020 | Sharma | G06N 5/04 |
| 2020/0333772 | A1 | 10/2020 | Srivastava et al. | |
| 2021/0012239 | A1 * | 1/2021 | Arzani | H04L 43/50 |
| 2021/0034581 | A1 | 2/2021 | Boven et al. | |
| 2021/0056430 | A1 * | 2/2021 | Wu | G06N 3/006 |
| 2021/0073376 | A1 * | 3/2021 | Tran | G06N 3/0464 |
| 2021/0109764 | A1 * | 4/2021 | Thon | G06N 20/00 |
| 2021/0150334 | A1 * | 5/2021 | Wolfe | G06F 17/14 |
| 2021/0158145 | A1 * | 5/2021 | Lin | G06N 3/047 |
| 2021/0174580 | A1 | 6/2021 | Mundy et al. | |
| 2021/0312284 | A1 * | 10/2021 | Dasgupta | G06N 3/08 |
| 2021/0362330 | A1 * | 11/2021 | Kolluri | G05B 19/423 |
| 2021/0390455 | A1 * | 12/2021 | Schierz | G06N 20/00 |
| 2022/0035346 | A1 | 2/2022 | Mercangoez et al. | |
| 2022/0309353 | A1 | 9/2022 | Han et al. | |
| 2023/0023896 | A1 * | 1/2023 | Schmidt | G06N 20/00 |
| 2023/0029400 | A1 * | 1/2023 | Schmidt | G05B 13/0265 |
| 2023/0356393 | A1 * | 11/2023 | Kolluri | B25J 9/0081 |
| 2025/0054008 | A1 * | 2/2025 | Cella | G06N 5/043 |

FOREIGN PATENT DOCUMENTS

| | | | |
|---|---|---|---|
| CA | 3050951 | A1 | 10/2019 |
| CN | 104794534 | A1 | 7/2015 |
| CN | 107291785 | A | 10/2017 |
| CN | 108805283 | A | 11/2018 |
| CN | 108885545 | A | 11/2018 |
| CN | 109325508 | A | 2/2019 |
| CN | 110084295 | A | 8/2019 |
| CN | 110569316 | A | 12/2019 |
| CN | 110728376 | A | 1/2020 |
| CN | 119743772 | A | 4/2025 |
| WO | WO 00/77594 | A2 | 12/2000 |
| WO | WO 2016/057365 | A1 | 4/2016 |
| WO | WO 2019/051615 | A1 | 3/2019 |
| WO | WO 2020/046261 | A1 | 3/2020 |

OTHER PUBLICATIONS

Bacciu et al., "Compositional Generative Mapping for Tree-Structured Data—Part II: Topographic Projection Model," *IEEE transactions on neural networks and learning systems*, 24(2): 231-247 (Dec. 27, 2012).

Bordel Sánchez et al., "Enhancing Process Control in Industry 4.0 Scenarios using Cyber-Physical Systems," *J. of Wireless Mobile Networks, Ubiquitous Computing, and Dependable Applications*, 7: 41-64 (Dec. 2016).

Dibowski et al., "Semantic Device and System Modeling for Automation Systems and Sensor Networks," *IEEE Transactions on Industrial Informatics*, 14(4): 1298-1311 (Jan. 23, 2018).

Fraccaroli et al., "Network Synthesis for Industry 4.0," *2020 Design, Automation & Test in Europe Conference & Exhibition (Date)*, IEEE, 1692-1697 (Mar. 9-13, 2020).

Grüner et al., "An Approach for Interconnection and Unification of State Models in Discrete Manufacturing," *2018 IEEE 16th International Conference on Industrial Informatics (INDIN)*, IEEE, 565-570 (Jul. 18-20, 2018).

Kim et al., "A New Parameter Repurposing Method for Parameter Transfer With Small Dataset and Its Application in Fault Diagnosis of Rolling Element Bearings," *IEEE Access*, 7: 46917-46930 (Apr. 18, 2019).

Wu et al., "Fault detection and diagnosis based on transfer learning for multimode chemical processes," *Computers & Chemical Engineering*, 135: 106731: 13 pp. (Apr. 6, 2020).

European Patent Office, International Search Report in International Patent Application No. PCT/EP2021/058474, 3 pp. (Sep. 3, 2021).

European Patent Office, International Search Report in International Patent Application No. PCT/EP2021/058476, 5 pp. (Jul. 2, 2021).

European Patent Office, International Search Report in International Patent Application No. PCT/EP2021/058477, 4 pp. (Jul. 2, 2021).

European Patent Office, Written Opinion in International Patent Application No. PCT/EP2021/058474, 10 pp. (Sep. 3, 2021).

European Patent Office, Written Opinion in International Patent Application No. PCT/EP2021/058476, 8 pp. (Jul. 2, 2021).

European Patent Office, Written Opinion in International Patent Application No. PCT/EP2021/058477, 8 pp. (Jul. 2, 2021).

The Patent Office of the People's Republic of China, Office Action in Chinese Patent Application No. 202180014548.X, 8 pp. (Apr. 30, 2025).

Das et al., "Hands-on automated machine learning," *Packt Publishing*, 14 pp. (Apr. 2018).

Jie, "Research and implementation of three-dimensional topological relationship analysis method of PDS pipeline model," *China Institute of Science and Technology and Innovation*, abstract, 0120180403098165, 4 pp. (2018).

Qiao et al., "A structure-enriched neural network for network embedding," *Expert Systems with Applications*, 117: 300-311 (Mar. 2019).

Shen, "Research and implementation of a three-dimensional topological relationship analysis method for PDS pipeline models," *National Science and Technology Library (NSTL)*, 4 pp. (Feb. 5, 2018).

Stack Exchange, "How to normalize data to 0-1 range?," StackExchange, Cross Validates, answer by Kmario23, downloaded from the Internet at https://stats.stackexchange.com/questions/70801/how-to-normalize-data-to-0-1-range, 2 pp. (Jan. 11, 2019).

Yosinski et al., "How transferable are features in deep neural networks?," *arXiv preprint, arXiv:1411.1792v1*, 14 pp. (Nov. 6, 2014).

Angelopoulos et al., "Tackling Faults in the Industry 4.0 Era—A Survey of Machine-Learning Solutions and Key Aspects," *Sensors*, 20: 34 pp. (Dec. 23, 2019).

Brandenbourger et al., "Design Pattern for Decomposition or Aggregation of Automation Systems into Hierarchy Levels," *IEEE 23rd*

(56) References Cited

OTHER PUBLICATIONS

*International Conference on Emerging Technologies and Factory Automation* (*ETFA*), pp. 895-901 (Sep. 4-7, 2018).
Schroeder et al., "A Methodology for Digital Twin Modeling and Deployment for Industry 4.0," *Proceedings of the IEEE*, 109(4): 556-567 (Apr. 2021).
Wang et al., "Deep learning for smart manufacturing: Methods and applications," *J. of Manufacturing Systems*, 48: 13 pp. (Jul. 2018).
Office Action and Search Report issued in corresponding Chinese Application No. 202180014548.X; dated Mar. 17, 2026; in Chinese with machine English translation (20 pages).

* cited by examiner

MACHINE LEARNING SYSTEM AND METHOD FOR CONNECTING LEARNING MODEL AND INDUSTRIAL PLANT THROUGH ABSTRACTION LAYER

CROSS-REFERENCE TO RELATED APPLICATIONS

This patent application claims priority to International Patent Application No. PCT/EP2021/058474, filed on Mar. 31, 2021, which claims priority to International Patent Application No. PCT/EP2020/059169, filed on Mar. 31, 2020, each of which is incorporated herein in its entirety by reference.

FIELD OF THE DISCLOSURE

The present disclosure relates to an industrial plant machine learning system, to a method for industrial plant machine learning communication, to a use of the industrial plant machine learning system in machine learning development, and to a computer program.

BACKGROUND OF THE INVENTION

Connecting machine learning to plant data is a challenging task. Data is distributed across many different system and it is not possible to provide ad-hoc all data required to train or score a machine learning model. Even if some relevant data is available, it is often not sufficient to train a well performing machine learning model. The application of the concept of transfer learning successful used on image date cannot be easily ported to industrial data like time-series/signal data and alarm and event data. The high dimensionality of industrial data, which easily is hundreds or thousands of data points, make the machine learning subject to the curse of dimensionality and very likely algorithms will overfit the provided training data.

Furthermore, Machine learning, ML, models for usage in process control and automation require access to historical and current process and plant data. Connecting a DCS to a ML model requires a large effort in selecting and configuring the necessary inputs for the ML model. This configuration is highly dependent on the plant topology, large re-engineering and model re-learning efforts are necessary after slight changes in the plant.

Especially in the process industry, each plant has a different automation system, different types of sensors, and different components even though the type of the plant and the product produced may be the same. Hence, generalization of machine learning models from one plant to another plant is not guaranteed.

Some ML models require labels to be trained on that conventionally are very expensive to obtain. Larger companies have many people working on the task of data labelling.

When put to continuous operation, the ML model starts to provide predictions. These are often only understandable for the person who trained the model if not documented well. If the model changes, potential other calculations based on the results fail.

Nowadays, the task of ML requires a lot of data engineering. Up to 80% of the time in a data science project including ML is spent searching for data and for the development of a data pipeline. For the next project on the same data sources, e.g. process plant, the effort remains the same.

Data science projects spend a significant time for data exploration—the understanding of data. In practice, the data is poorly documented, so data scientists spend lots of time for this task.

Implementing ML solutions has some design options. The prediction calculation could be done at a multitude of locations, in the cloud or on premise. At the end the consuming application of the results needs to know where to look. This information is often hard coded into the application which makes changes and modifications difficult.

BRIEF SUMMARY OF THE INVENTION

According to an aspect of the present disclosure, an industrial plant machine learning system comprises a machine learning model, providing machine learning data and an industrial plant providing plant data, an abstraction layer, connecting the machine learning model and the industrial plant, wherein the abstraction layer provides standardized communication between the machine learning model and the industrial plant, using a machine learning markup language.

The term "markup-language", as used herein, is configured for organizing the component of the industrial plant, in particular for identifying correct technical names for the components in order to extract the respective data.

In process automation system signals for example about status and performance of a control loop or for example measurements instruments have technical names that depend on the automation system, the used engineering and library and a plant specific naming convention. The markup-language for example organizes the technical system names based on the plant topology (process to unit, vessel and finally control loop) and provides additional information like for instance which variable is controlled. This enables an simple, automatic query to identify the required technical signals independent of the specific implementation of the automation system. Alternatives to a mark-up language are simple mapping tables or key-value based documents like JSON.

The machine learning markup language allows to make changes at components or applications of the industrial plant, also referred to as industrial plant floor, without having to change anything in the machine learning model, in particular on a machine learning calculation pipeline.

In other words, the abstraction layer is configured to manage a data transfer between the machine learning unit and the industrial plant.

BRIEF DESCRIPTION OF THE SEVERAL VIEWS OF THE DRAWING(S)

Exemplary embodiments of the invention will be described in the following with reference to the accompanying drawings.

DETAILED DESCRIPTION OF THE INVENTION

Figure 1:
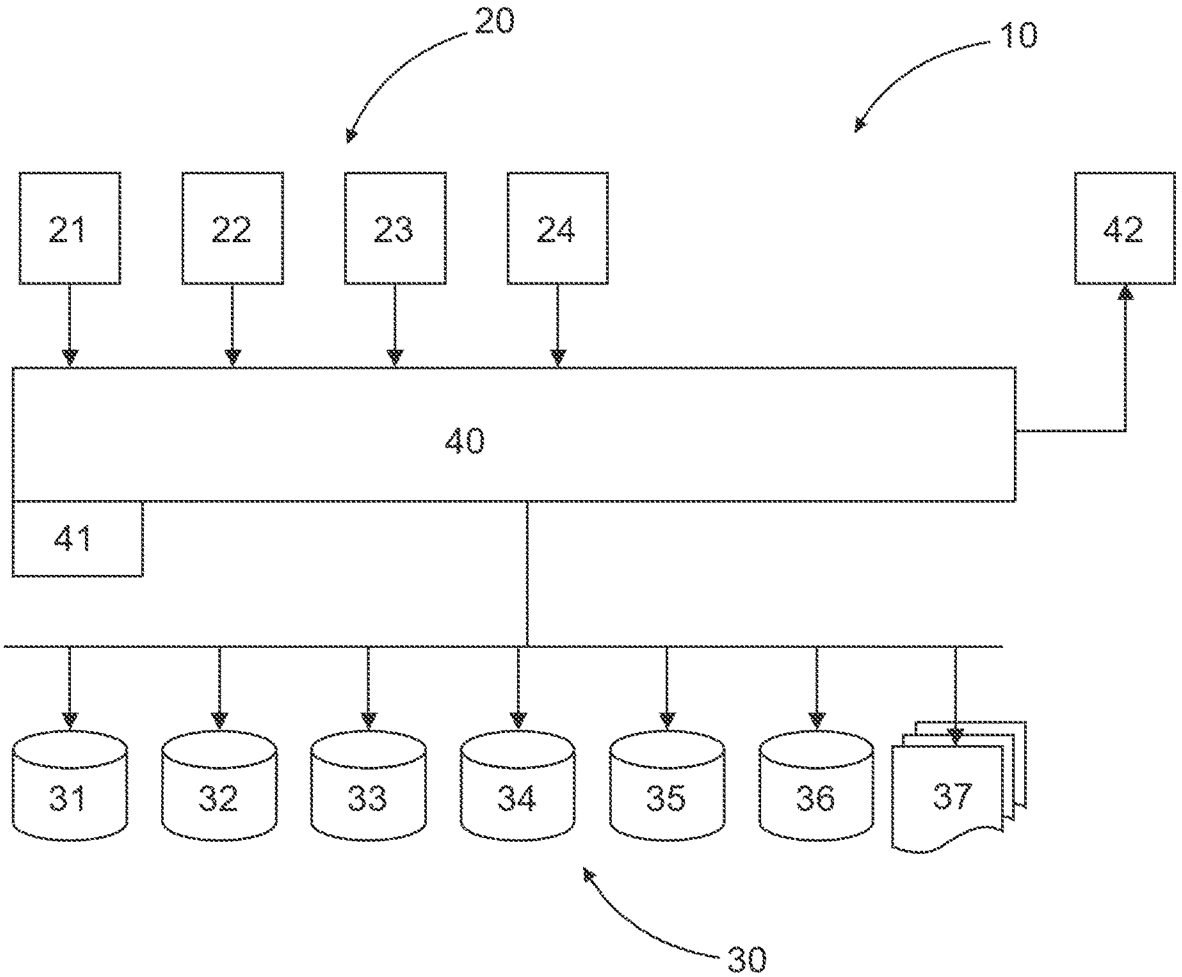
FIG. 1 is a schematic of an Industrial plant machine learning system in accordance with the disclosure.

The reference symbols used in the drawings, and their meanings, are listed in summary form in the list of reference symbols. In principle, identical assembly parts are provided with the same reference symbols in the figures.

Preferably, the functional modules and/or the configuration mechanisms are implemented as programmed software modules or procedures, respectively; however, one skilled in the art will understand that the functional modules and/or the configuration mechanisms can be implemented fully or assembly partially in hardware.

FIG. 1 shows an industrial plant machine learning system 10, comprising a machine learning model 20, an industrial plant 30 and an abstraction layer 40, connecting the machine learning model 20 with the industrial plant 30. The machine learning model 20 comprises a user unit 21, a training unit 22, a scoring unit 23 and a visualisation unit 34. The industrial plant 30 comprises a distributed control system , DCS, 31, a historian 32, an enterprise resource planning unit 33, a computerized maintenance management system, CMMS, 34, a content management system , CMS, 35, a laboratory information management system, LIMS, 36 and a process flow unit 37, for example comprising P&ID and IO lists. The abstraction layer 40 comprises an access control unit 41, managing an access of data between the machine learning model 20 and the industrial plant 30. Additionally, the abstraction layer 40 comprises a directory service, managing network resources of the abstraction layer 40.

Thus, an abstraction layer 40 is defined between the industrial plant 30, in particular the DCS 31, and a machine learning model 20, in particular machine learning-related applications. A machine learning meta language is used to standardize communication between the machine learning model 20 and the industrial plant 30. In particular, the machine learning meta language is used to standardize communication between the DCS 31 as well as historian 32 and other data sources. The abstraction layer 40 comprises an application programming interface, API, to provide data on requests with strict access control, being able to distinguish different receivers. Thus, a mechanism can be provided to automatically generate a finite-state machine describing the industrial plant 30 and by providing labels for a supervised machine learning model.

Thus, machine learning can be offered inexpensively to a customer. Additionally, machine learning projects, run by a distributor or by a customers, are speed up. Applications of the industrial plant 30 can consume machine learning results easily without having to know how and where they are generated. Changes in the machine learning model do not require to "rewire" the industrial plant applications, in particular plant floor applications. Data access for machine learning can be made secure and controlled via the abstraction layer 30. Generation of labelled data is made inexpensive and therefore quality of machine learning models 20 is enhanced. Plant floor data is provided in a structured manner via a Machine Learning Markup Language. The machine learning markup language allows to make changes at the plant floor without having to change anything in the machine learning models 20 or machine learning calculation pipeline. Thus, a mechanism to manage execution of machine learning algorithms at various places based on optimization criteria can be provided.

In the prior art, when a machine learning model is connected to a DCS, the inputs of the machine learning model are directly connected to some of the signals and process variables available in the control system and/or historian. This is a tedious process, requires domain expertise in the selection of appropriate signals and is dependent on the plant topology, the signal naming scheme as well on the control systems and historian vendor.

However, the abstraction layer 40 between the industrial plant 30 and the machine learning model 20, in particular the machine learning applications, speeds up the development, implementation and operation of machine learning. The machine learning markup language is used to standardize communication between the machine learning model 20 and the industrial plant 30. The abstraction layer 40 can be located either in a cloud or on promise of the industrial plant 30 on an edge device and manages the data flow between data sources and sinks.

This standardization reduces configuration effort and provides an easy way for reconfiguration and re-learning after plant changes. In addition, it provides a mechanism to automatically generate a finite-state machine from the DCS program that can be used to provide labels with state and phase information to a supervised machine learning model.

In its simplest version the abstraction layer 40 provides an abstraction with respect to the plant data.

In a bottom- up view, the industrial plant 30 generates data, in particular structured data like time series, alarms and events, as well as unstructured data like reports. This is stored locally in a historian 32 or other systems. From there a subset can be transmitted to the cloud, e.g. via an Edge Device. The CMMS provides a local view on the data. An enterprise dashboard application provides a global view on the data.

The abstraction layer 40 is designed especially with a focus on machine learning needs. It provides secured and structured access to the industrial plant data. Users will only be able to see what they are entitled to see. Structure is imposed by using the machine learning markup language. There the data is enriched with meta data and labels, essential for machine learning. For connecting the abstraction layer 40 to the industrial plant 30, technologies like OPC UA, MQTT etc. are used which can structure plant data.

In addition to structured plant data, the abstraction layer 40 also provides information about plant states and labels. Therefore, a mechanism to analyze DCS code, e.g. by code expression tree analysis, is used to automatically generate from a DCS program a finite state machine. The abstraction layer 40 can provide the auto-generated states as labels for the training of supervised machine learning models to a machine learning engineer.

In case of changes to the industrial plant machine learning system 10, e.g. change of a component, the new data source is simply connected to the abstraction layer 40 again. Hence, someone who is consuming the data with the abstraction layer 40 will not notice any changes.

In a top-down view, the user can connect to the abstraction layer 40, can send requests to it, trigger services, e.g. search, get, and get structured machine learning markup language answer back. These can be directly consumed in the machine learning design environment, e.g. Python, R, Matlab.

The machine learning engineer sends a search request to the abstraction layer 40. The engineer does not need to know all the details but (s)he can ask the abstraction layer 40 for all available data fulfilling a specified criterion.

The machine learning engineer can the send a get request to the abstraction layer 40 to get the specified data in machine learning markup language.

In a data exploration phase, at the beginning of a machine learning project the engineer needs to get an understanding of the data available. The abstraction layer 40 provides services like search which allows for automatic search for data available. This data is provided via machine learning markup language in a structured way, hence, can directly be consumed by a data exploration tool.

In a training phase, the machine learning engineers run many experiments to build prediction models. If supervised learning models are to be developed, the labelled data can automatically be consumed by the machine learning development environment.

During the test and validation phase, the developed model can be automatically compared against test and validation data.

In a deployment phase, the resulting machine learning model 20 can be put into operation and "announced" to the abstraction layer 40 via MLML. It is not important where the machine learning model 20 was deployed. The results can be consumed via the abstraction layer 40.

In an operations phase, the plant data needed by the machine learning model 20 will be provided by the abstraction layer 40. The results of a prediction model of the machine learning model 20 can again be consumed via the abstraction layer 40. Any changes made to the machine learning model 20 can easily be implemented as long as the same data is consumed and the same type of result is produced.

Transfer of the machine learning model 20 to other industrial plants is simplified if there also an abstraction layer 40 exists as long as the same type of data can be provided.

In addition, the abstraction layer also handles data exchange between applications and analytics algorithms.

Instead of directly connecting to the plant data, the abstraction layer 40 is used to get the data. Therefore, subscription services can be used, which provide new data always when changes in the plant data occurred. Any plant data generated within these applications can again be provided via the abstraction layer 40. This includes any machine learning models within the application itself.

Analytics include machine learning algorithms as well as other calculation functions. Instead of directly getting the data from the sources, the abstraction layer 40 can be used to provide the needed data and to provide the results of the calculations.

In addition, the abstraction layer can also be used with existing software solutions and BI solutions.

Existing software applications are usually designed in a way that no automatic data extraction is enabled, and data must be provided in a certain structure. These can be coupled to the abstraction layer 40 via connectors. The task of these connectors is to translate the data so it fits to the application. The connectors can be based on existing standards.

The data made available by the existing application is often not meant to be shared; usually only export files in machine readable format are created on demand. The connector can read these and make them available to the abstraction layer 40.

BI solutions like PowerBI, Qlik or Tableau are used by decision makers to analyse the current status, find root cause for problems and get impact predictions about the plant performance. These can interact with the abstraction layer 40 to get life data and filter according to their needs.

Thus, the data engineering is simplified drastically.

The abstraction layer 40 might serve ad-hoc queries specified by a user to serves to fill pre-define machine learning templates, which define the data requirements of a machine learning algorithms in a semantic fashion, e.g. by specifying that certain features like "reactor temperature, head pressure, tail pressure" or "drive-side vibration measurement on the pump" are required as input to the system.

The abstraction layer 40 either uses a statically defined mapping of data points in the IT/OT system to identify the data points, or analysis data description, e.g. in IO list, or configuration data in the DCS, data point names, Identifier, names, etc., with help of natural language processing techniques, in particular Named-Entity Recognition, analysis of plant topology with the help of graph algorithms to identify the right data points in the data sources. As post postprocessing step, the abstraction layer 40 can perform "sanity check" on the extracted data, e.g., if the recorded data actually behaves like a temperature or vibration signals or shows the cross correlation that are to be expected based on plant or asset topology, e.g. if a vibration signal from a vibration sensor on a pump, blower or gearless mill drives matches the electrical signals, in the simplest case as an on/off information.

Figure 2:
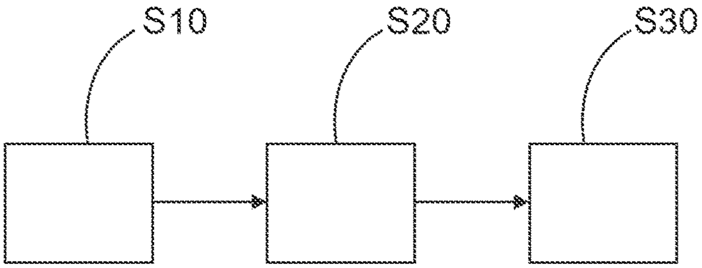
FIG. 2 is a flowchart of a method for industrial machine learning communication in accordance with the disclosure.

FIG. 2 describes a method for industrial plant machine learning communication, comprising the following steps. In a first step S10, by a machine learning model, machine learning data is provided. In a second step S20, by an industrial plant 30, plant data is provided. In a third step S30, by an abstraction layer 40 that connects the machine learning model and the industrial plant 30 standardized communication is provided between the machine learning model and the industrial plant 30, using a machine learning markup language.

Preferably, the plant data comprises structured data, in particular time series, alarms and events, and unstructured data, in particular reports.

Preferably, the plant data is stored locally in an historian of the industrial plant. As the machine learning model needs to be provided with the plant data of the historian via the DCS, the connection between the historian, the DCS and the machine learning model is crucial for the machine learning model. The abstraction layer allows a change in the machine learning model without determining new connections to the historian or the DCS, as the abstraction layer provides standardized communication.

Preferably, in case of changes to a component of the system, the new data source is just connected to the abstraction layer again. Thus, a data consumer using the abstraction layer, for example a user or another component of the system, will not notice any changes.

Preferably, a user can connect to the abstraction layer using an input interface of the system. The user can send requests to the abstraction layer. The requests trigger services, for example search or get, in the abstraction layer and the abstraction layer provides the user with a structured response using the machine learning markup language.

In other words, the abstraction layer enables a communication between the machine learning model, in particular machine learning applications, and the industrial plant, in particular a distributed control system, DCS, of the industrial plant. The abstraction layer provides an abstraction and translation between industrial operation technology, OT as well as industrial information technology, IT, and machine learning.

Depending on the data flow direction, the machine learning model and the industrial plant comprise data consumers and/or data sources. The abstraction layer manages the data flow between the data sources and the data consumers, which are also called data sinks.

Preferably, the abstraction layer provides an abstraction with respect to the plant data. In this so called bottom up view, the abstraction layer is configured to provide the abstracted plant data to the machine learning model. Further preferably, the abstraction layer provides an abstraction with respect to the machine learning data, in particular machine learning predictions provided by the machine learning model. In this so called top down view, the abstraction layer is configured to provide the abstracted machine learning data to the industrial plant.

This standardized communication reduces configuration effort and provides an easy way for re-configuration and re-learning after changes of the industrial plant. In addition, it provides a mechanism to automatically generate a finite-state machine from the DCS program that can be used to provide labels with state and phase information to a supervised machine learning model.

The standardization reduces configuration effort and provides an easy way for re-configuration and learning after changes to the industrial plant happen.

Due to the abstraction layer, all components of the industrial plant and the machine learning model are interchangeable with similar components without necessary amendments on other components of the industrial plant and the machine learning model.

The abstraction layer also allows to manage execution of machine learning algorithms of the machine learning model at various places based on optimization criteria.

Thus, the abstraction layer allows to provide an industrial plant machine learning system with improved speed in development, implementation and operation.

In a preferred embodiment, the abstraction layer is configured to enrich the received plant data with context data, wherein the context data comprises plant states.

The term "plant states," as used herein, comprises a state of process variables and/or a state of components, for example comprises a steady state or a startup state.

Thus, the abstraction layer allows to provide an industrial plant machine learning system with improved speed in development, implementation and operation.

In a preferred embodiment, the industrial plant comprises a distributed control system, DCS, wherein the abstraction layer is configured to determine the context data by analysing a code of the DCS to automatically generate a finite state machine for auto-generating the plant states.

The term "analyzing the code of the DCS", as used herein, comprises transferring the code of the DCS into a so-called Expression Tree, in which the entire code is represented in the form Method→Branch→Expression→Operator→Binary Operation. The context data, in particular the plant state, is then the currently active node in the expression tree or subtree in the expression tree. Subtrees in the expression tree correspond to subroutines such as steady-state control, automatic startup or shutdown, safety logic.

Thus, the abstraction layer allows to provide an industrial plant machine learning system with improved speed in development, implementation and operation.

In a preferred embodiment, the abstraction layer is configured to use a code expression tree analysis for analyzing the code of the DCS. An expression tree represent the automation code in tree-like structure, where each node in the tree is an expression, a subroutine, or a binary operations like a>b. During execution, the program will be in some node of the expression and tree and the node or a subtree can be mapped on the state of the DCS or the plant. The state will be characterized by the ID of the currently active nodes in the expression tree.

In a preferred embodiment, the machine learning model is configured to use the plant states as labels for training the machine learning model.

Thus, a generation of labelled data for the machine learning model is made inexpensive and therefore the quality of the machine learning model is enhanced.

In a preferred embodiment, the abstraction layer is configured to abstract the machine learning data and the plant data.

The term "abstract," as used herein, comprises a grouping of complex data that are then represented by an abstracted version of these data. For example, all signals of temperature sensors are abstracted by a single data set. The abstraction layer abstracts from the concrete implementation of the automation, e.g. the naming convention and the decision which control runs on which hardware with which IO. This allows the machine learning system to work with generic queries like "all tank temperatures" or all "signals in all control loops in unit X".

In a preferred embodiment, a connection between the abstraction layer and the industrial plant uses a platform-independent communication technology.

In a preferred embodiment, the platform-independent communication technology comprises OPC Unified Architecture, OPC UA, or Message Queuing Telemetry Transport, MQTT.

In a preferred embodiment, abstracting the plant data comprises standardizing and abstracting vendor specific parts and industrial plant specific parts using the machine learning markup language.

In a preferred embodiment, the abstraction layer is located in an edge device located near the industrial plant.

Alternatively, the abstraction layer is located in a cloud environment.

In a preferred embodiment, the abstraction layer comprises an application programming interface, API, that provides standardized access to the plant data.

Preferably, the API works in a vendor and plant topology independent way.

In a preferred embodiment, the application programming interface comprises an access control unit, providing access control for a user to the industrial plant data and the machine learning data.

Preferably, the access control unit ensures secured and controlled access to plant data and machine learning data.

Preferably, the access control unit enforces restricted data exchange to only necessary data meeting privacy requirements.

According to an aspect of the invention, a method for industrial plant machine learning communication, comprises the following steps. In a first step, by a machine learning model, machine learning data is provided. In a second step, by an industrial plant, plant data is provided. In a third step, by an abstraction layer, that connects the machine learning model and the industrial plant, standardized communication between the machine learning model and the industrial plant is provided, using a machine learning markup language.

According to an aspect of the invention, a use of an industrial plant machine learning system, as described herein, in machine learning development is provided.

According to an aspect of the invention, a computer program is provided comprising instructions, which, when the program is executed by a computer, cause the computer to carry out the steps of a method, as used herein.

List of Reference Symbols

10 Industrial plant machine learning system
20 machine learning model
21 user unit
22 training unit
23 scoring unit
24 visualisation unit
30 industrial plant
31 distributed control system

32 historian
33 enterprise resource planning
34 computerized maintenance management system
35 content management system
36 laboratory information management system
37 process flow unit
40 abstraction layer
41 access control unit
42 directory service
S10 first step
S20 second step
S30 third step All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An industrial plant machine learning system, comprising:

a machine learning model providing machine learning data;

an industrial plant providing plant data; and an abstraction layer connecting the machine learning model and the industrial plant;

wherein the abstraction layer is configured to provide communication between the machine learning model and the industrial plant using a machine learning markup language;

wherein the industrial plant comprises a distributed control system (DCS), and wherein the abstraction layer is configured to determine plant states by analyzing a code of the DCS to automatically generate a finite state machine for auto-generating the plant states and to provide the plant states as abstracted plant data to the machine learning model;

wherein the machine learning model is configured to use the plant states as data labels for training and machine learning; and wherein the machine learning model is trained using the plant states and the data labels and the trained machine learning model is used in a process control system or an automation system.

2. The system of claim 1, wherein the abstraction layer is configured to use a code expression tree analysis for analyzing the code of the DCS.

3. The system of claim 1, wherein the abstraction layer is configured to abstract the machine learning data and plant data.

4. The system of claim 1, wherein a connection between the abstraction layer and the industrial plant uses a platform-independent communication technology.

5. The system of claim 4, wherein the platform-independent communication technology comprises one of: OPC Unified Architecture (OPC UA) or Message Queuing Telemetry Transport (MQTT).

6. The system of claim 3, wherein abstracting the plant data comprises standardizing and abstracting vendor specific parts and industrial plant specific parts using the machine learning markup language.

7. The system of claim 1, wherein the abstraction layer is located in an edge device located near the industrial plant.

8. The system of claim 1, wherein the abstraction layer comprises an application programming interface (API) that provides standardized access to the plant data.

9. The system of claim 8, wherein the API comprises an access control unit providing access control for a user to the industrial plant data and the machine learning data.

10. A method for industrial plant machine learning communication, comprising:

providing, by a machine learning model, machine learning data;

providing, by an industrial plant, plant data; and providing, by an abstraction layer that connects the machine learning model and the industrial plant, communication between the machine learning model and the industrial plant using a machine learning markup language;

wherein the industrial plant comprises a distributed control system (DCS), and wherein the method further comprises using the abstraction layer to determine plant states by analyzing a code of the DCS to automatically generate a finite state machine for auto-generating the plant states;

providing the plant states as abstract data to the machine learning model;

using, by the machine learning model, the plant states as labels for training and machine learning;

wherein the trained machine learning model is used in a process control system or an automation system.

11. The method of claim 10, further comprises causing the abstraction layer to use a code expression tree analysis for analyzing the code of the DCS.

12. The method of claim 10, further comprising using the abstraction layer to abstract the machine learning data and plant data.

13. The method of claim 12, wherein abstracting the plant data comprises standardizing and abstracting vendor specific parts and industrial plant specific parts using the machine learning markup language.

14. The method of claim 10, wherein the abstraction layer is located in an edge device located near the industrial plant.

* * * * *